United States Patent [19]

Herbort et al.

[11] Patent Number: 4,647,436

[45] Date of Patent: Mar. 3, 1987

[54] REACTION TUBE SYSTEM FOR A STEAM REFORMER

[75] Inventors: Hans-Joachim Herbort, Frondenberg; Manfred Severin, Schwerte-Geisecke, both of Fed. Rep. of Germany

[73] Assignee: UHDE GmbH, Dortmund, Fed. Rep. of Germany

[21] Appl. No.: 764,667

[22] Filed: Aug. 9, 1985

[30] Foreign Application Priority Data

Aug. 10, 1985 [DE] Fed. Rep. of Germany ..... 34295224

[51] Int. Cl.⁴ .......................... B01J 8/06; F16L 13/02
[52] U.S. Cl. ................................. 422/197; 165/134.1; 165/913; 165/921; 196/107; 196/110; 196/116; 285/45; 285/115; 285/329; 405/216; 422/148; 422/203; 422/312
[58] Field of Search ............... 422/196, 197, 203, 312; 285/45, 115, 329; 196/107, 110, 116; 165/134.1, 921, 913; 405/216

[56] References Cited

U.S. PATENT DOCUMENTS 3,600,141  8/1971  Mevenkamp et al. .............. 422/197
3,907,336  9/1975  Siegmund ............................ 285/45
4,175,779  11/1979  Apblett, Jr. ........................ 285/286

FOREIGN PATENT DOCUMENTS 1542530  5/1974  Fed. Rep. of Germany .
3036398  4/1981  Fed. Rep. of Germany ........ 285/45

*Primary Examiner*—Michael S. Marcus
*Attorney, Agent, or Firm*—Marshall & Melhorn

[57] ABSTRACT

A reaction tube system of a steam reformer, more generally referred to as tubular cracking furnace, for the indirect heating of cracking feedstock, such as the catalytic cracking of hydrocarbons, includes a plurality of reaction tubes and headers, the reaction tubes penetrating through the bottom of the steam reformer and being extended to the associated header by low-alloy tube sections attached to the tubes by circumferential welds. The reaction tubes are surrounded in the area of the weld(s) by a coaxial protective tube having one open end and defining a free annular space around the reaction tube. The protective tube prevents deterioration by corrosion of the weld(s) joining the tube sections of high-alloy steel with low-alloy extension sections with unalloyed steel extension section.

5 Claims, 2 Drawing Figures

REACTION TUBE SYSTEM FOR A STEAM REFORMER

BACKGROUND OF THE INVENTION

The invention relates generally to a reaction tube system of a steam reformer for the indirect heating of cracking feedstock, such as the catalytic cracking of hydrocarbons, and more particularly to a plurality of reaction tubes and headers, the reaction tubes penetrating through the bottom of the steam reformer and being extended to the associated header by low-alloy tube sections attached to the reaction tubes by circumferential welds. The tube sections located outside the steam reformer are provided with internal insulation. These steam reformers are more generally referred to as tubular cracking furnaces in which the cracking process takes place at high pressures of 15 bar and more and at high temperatures of 600° C. and more.

West German Pat. No. 15 42 530 describes a tubular cracking furnace in which groups of reaction tubes are connected to separate headers. The headers are provided with internal insulation and are located beneath the cracking furnace. Outside the furnace bottom, the reaction tubes formed of high-grade material are extended to the headers and are provided with internal insulation from the top edge of the furnace bottom. The internal insulation permits using lower-grade material or even unalloyed material for the extension sections of the reaction tubes. The extension section between the reaction tube and the associated header may be attached by means of connecting flanges or by welding.

For the tube sections which are exposed to pressure and heat loads, it is imperative that a certain definite internal temperature profile be maintained to avoid overload. This is achieved by selecting the right material and thickness for the internal insulation. The sizing of the internal insulation is governed by the desire to reduce the heat transfer to the inside surface of the extension tube section as created by the design and by the rate of heat dissipation by the tube to the ambient air. This design is based on defined internal and external temperatures and heat transfer coefficients.

Deterioration of the system by corrosion of the welds joining high-alloy tube sections and low-alloy or unalloyed tube sections was a prior art problem that had to be eliminated.

SUMMARY OF THE INVENTION

According to the present invention, the above problem is solved in that the area of each weld on the reaction tubes is surrounded by a coaxial protective tube with one open end, leaving a free annular space between the protective tube and the reaction tube.

It is an object of the invention to provide means for protecting the outside surface of the reaction tube sections located outside a cracking furnace from an uncontrolled heat efflux while avoiding the use of insulation on the reaction tube. A protective tube surrounding the reaction tube defines a free annular space that ensures that, during operation of the cracking furnace and at full gas temperature within the internal insulation, sufficient heat will be dissipated from the outside surface of the reaction tube section located outside the cracking furnace while also subcooling of the tubes and the welds is prevented at the time of abnormal weather conditions. This device assures that the tube will never be at a temperature that is equal to or less than the dewpoint temperature of the reaction gas. It prevents the formation of condensate between internal insulation and the inside surface of the tube, and consequently, any corrosive attack on the inside surface of the tube and on the welds.

BRIEF DESCRIPTION OF THE DRAWINGS

The above as well as other objectives of the invention will become readily apparent to those skilled in the art from reading the following detailed description of a preferred embodiment of the invention when considered in the light of the accompanying drawings, in which.

DETAILED DESCRIPTION OF THE PREFERRED EMBODIMENT

Figure 1:
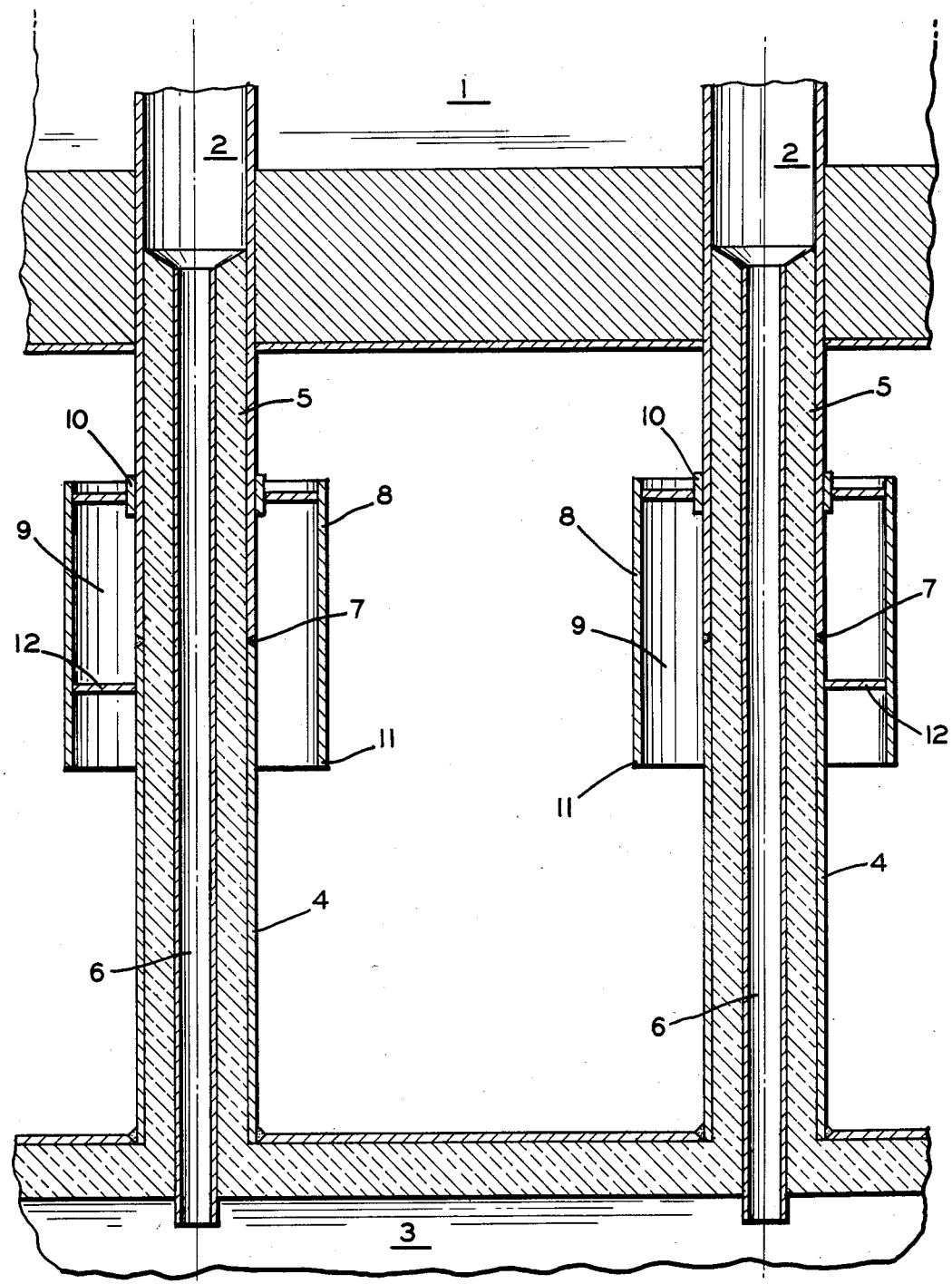
FIG. 1 is a fragmentary sectional view of a steam reformer tube system employing the features of the invention.

Referring to FIG. 1, a tubular cracking furnace 1 contains a plurality of reaction tubes 2 having lower ends which terminate in an internally insulated header 3. Outside the cracking furnace, the reaction tube 2 is formed of high-alloy austenitic steel and is connected to the header 3 by an extension tube section 4 formed of ferritic steel. The lower part of the reaction tube 2 and the extension tube section 4 contain the internal insulation 5 and the hot central tube 6 through which the reaction gas passes into the header 3 at approximately 730° to 920° C. In order to prevent excessive heat dissipation in the area of a weld 7, the reaction tube is surrounded by a protective tube 8 with a free annular space 9 being left between the protective tube and the reaction tube. The protective tube 8 is closed at its upper end in the lower area of reaction tube 2 and is attached to the reaction tube by means of a sleeve 10 which permits relocation and attachment on the reaction tube. The protective tube 8 is open at its lower end 11. The length of the protective tube is sufficient for the lower open end to terminate well below the weld 7. In order to ensure equal distance for any length of protective tube 8 at any point with reference to the reaction tube 2 and the extension section 4, the protective tube may be provided with internal spacers 12 which must not, however, obstruct the circulation of air within the annular space 9.

Figure 2:
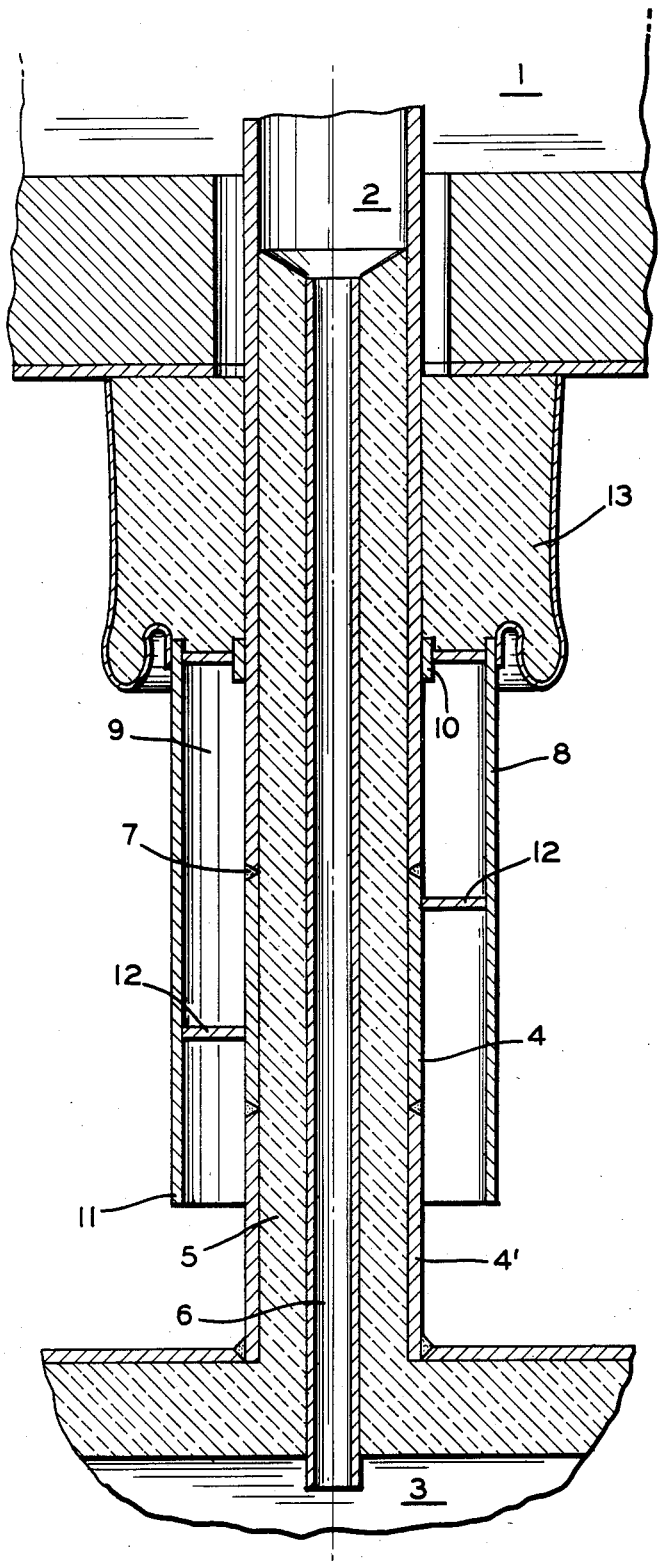
FIG. 2 is a fragmentary sectional view of one of the tubes shown in FIG. 1 employing the features of the invention.

Referring to FIG. 2, the reaction tube 2 can be provided with two extension sections 4 and 4' for connection to the header 3. In this case, extension section 4 is made of ferritic steel while extension section 4' is formed of unalloyed steel. The mixed welds joining the three tube sections, austenitic-ferritic and ferritic-unalloyed, are protected from excessive heat efflux by a protective tube 8 of adequate length. Spacers 12 are provided again in the protective tube to maintain a regular free annular space 9 over its entire length with reference to the reaction tube. Also, insulation 13 may be provided around the outside of the tube 2 above the upper end of the protective tube 8.

The reaction tube system described above may be varied in that two or more reaction tubes could be surrounded by a common protective tube. In accordance with the provisions of the patent statutes, the principle and mode of operation of the present invention have been discussed in what is considered to represent its best embodiment. However, it should be understood that the invention may be practiced otherwise than as specifically illustrated and described without departing from its spirit or scope.

What is claimed is:

1. In a reaction tube system of a steam reformer for the indirect heating of cracking feedstock, the system including a plurality of reaction tubes and headers, the reaction tubes penetrating through a bottom of a steam reformer and being extended to the associated header by low-alloy tube sections attached to the reaction tubes in end-to-end relation by circumferential welds, the tube sections located outside the steam reformer being provided with internal insulation, the improvement comprising:

a protective tube coaxial with at least one of said reaction tubes and having a closed upper end and a lower open end, said protective tube defining a free annular space around said one reaction tube, said free annular space extending on both sides of said circumferential weld attaching said one reaction tube to the associated tube section, said protective tube being attached to at least one of said one reaction tube and the associated tube section.

2. The reaction tube system according to claim 1 wherein said upper end of said protective tube is in gastight contact with said one reaction tube.

3. The reaction tube system according to claims 1 or 2 including spacers positioned within said protective tube for maintaining said protective tube in a spaced relationship to said one reaction tube.

4. The reaction tube system according to claim 1 wherein said protective tube is displaceable in a longitudinal direction along said one reaction tube.

5. The reaction tube system according to claim 3 wherein said protective tube is displaceable in a longitudinal direction along said one reaction tube.

* * * * *